July 29, 1947.  V. A. MARCO  2,424,574
SIGNAL LIGHT
Filed Oct. 16, 1943  2 Sheets-Sheet 1

Inventor
VINCENT ANTHONY MARCO
By Clarence A. O'Brien
and Harvey B. Jacobson
Attorneys July 29, 1947.  V. A. MARCO  2,424,574
SIGNAL LIGHT
Filed Oct. 16, 1943   2 Sheets-Sheet 2
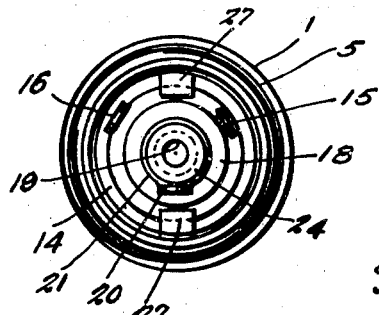
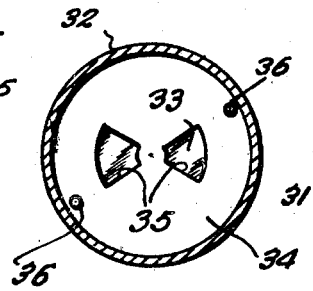
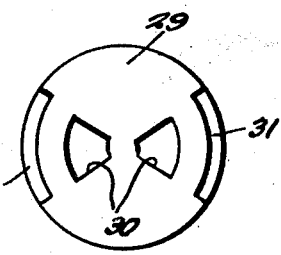
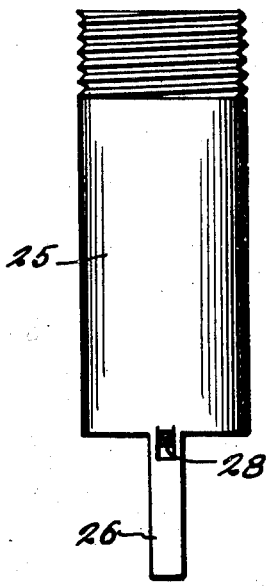
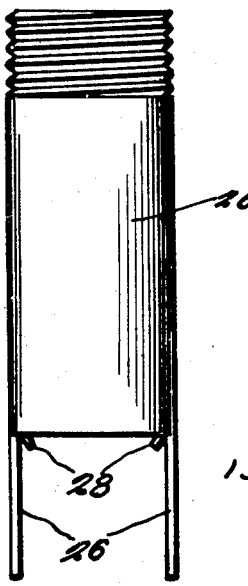
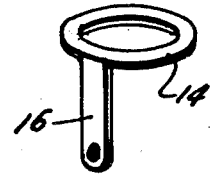
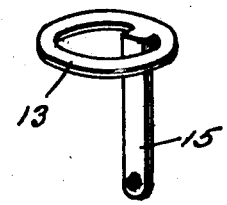
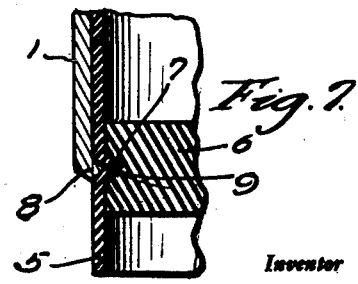
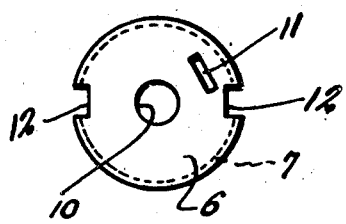
Inventor
VINCENT ANTHONY MARCO
By Clarence A. O'Brien
and Harvey B. Jacobson
Attorneys Patented July 29, 1947

2,424,574

UNITED STATES PATENT OFFICE 2,424,574

SIGNAL LIGHT

Vincent Anthony Marco, Beverly Hills, Calif.

Application October 16, 1943, Serial No. 506,566

5 Claims. (Cl. 177—311)

This invention relates to signal lights of a generally similar nature to that constituting the subject matter of my copending application Serial No. 476,955, filed February 24, 1943, upon which the present device constitutes an improvement.

Signal lights are used in many fields for indicating the existence or lack thereof of certain conditions at points which are remote or not within the vision of a person observing the light. For example, on airplanes it is customary to have on the instrument panel before the pilot signal lights for automatically indicating when the landing wheels of the craft are in either retracted or lowered position. However, when the signal lamp fails to light when the landing wheels are supposed to have been lowered or raised, the pilot can never be certain whether said lamp has simply burned out or whether the landing wheels are not, in fact, in the desired position. As in my aforementioned copending application, the primary object of the present invention is to provide novel means whereby it may be expeditiously ascertained on the spot whether or not failure of the lamp to light is due to the fact that said lamp is burned out.

Another very important object of the present invention is to provide, in a manner as hereinafter set forth, a novel construction and arrangement whereby the automatic, remotely controlled electric circuit to the lamp will be broken before the testing circuit is closed and vice versa.

Still another important object of the invention is to provide a unique construction and arrangement whereby the volume of light from the signal lamp may be regulated or controlled as desired.

Other objects of the invention are to provide a signal light of the character set forth which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawing wherein like characters of reference designate corresponding parts throughout the several views, and wherein:

Figure 1 is a view in front elevation of a signal light constructed in accordance with the present invention.

Figure 2 is a view in top plan of the device, showing a portion of the panel in horizontal section.

Figure 3 is a view in rear elevation of the device.

Figure 4 is a view in horizontal section, taken substantially on the line 4—4 of Figure 1.

Figure 5 is an elevational view of the slidable cylinder.

Figure 6 is an elevational view of the slidable cylinder, taken at right angles to Figure 5.

Figure 7 is a fragmentary view in section, taken substantially on the line 7—7 of Figure 2.

Figure 8 is a cross sectional view, taken substantially on the line 8—8 of Figure 2.

Figure 9 is a detail view in front elevation of the stationary shutter.

Figures 10 and 11 are detail views in perspective of the inner and outer contact rings.

Figure 12 is a detail view in elevation of the stationary insulating disc on which the contact rings are mounted.

Figure 13 is a diagrammatic view of the electric circuit.

Referring now to the drawings in detail, it will be seen that the embodiment of the invention which has been illustrated comprises a tubular housing 1 which is open at both ends. Nuts 2 secure the housing 1 in position in an opening provided therefor in an instrument panel 3. The forward end portion of the housing 1 is externally threaded, as at 4, to accommodate the nuts 2.

Mounted in the housing 1 and projecting beyond the ends thereof is a sleeve 5 of suitable insulating material. Mounted in the rear end portion of the sleeve 5 is a disc 6 which is also of suitable insulating material. The disc 6 is circumferentially grooved, as at 7, to receive the inwardly peened rear end portion 8 of the housing 1 for firmly securing said disc in position. The peen 8 forms a crimp 9 in the insulating sleeve 5 which is accommodated by the peen 8. It will thus be seen that the peen 8 also secures the insulating sleeve 5 in position. The insulating disc 6 is further provided with a central opening 10, an off-center opening 11 and longitudinal grooves 12 in its periphery.

Contact rings 13 and 14 are mounted on the faces of the insulating disc 6. The rings 13 and 14 are provided, respectively, with rearwardly projecting prongs 15 and 16. The prong 15 of the front or inner ring 13 projects through the opening 11 in the disc 6. Insulating washers 17 and 18 secure the rings 13 and 14 in position on the disc 6. The washers 17 and 18, in turn, are secured in position through the medium of a stationary center contact 19 in the form of a rivet which passes through the opening 10 in the disc 6. A prong 20 is mounted on the rear end portion of the rivet 19 through the medium of a ring 21 on one end of said prong. Secured between the head 22 of the contact 19 and the washer 17 is a forwardly projecting coil spring 23. The assembly is secured by spreading the rear end of the contact 19, as at 24.

Mounted for longitudinal sliding movement in the housing 1 and projecting forwardly therefrom is a metallic cylinder 25. The cylinder 25, which is insulated from the housing 1 by the sleeve 5, is also open at its ends. Projecting longitudinally from the rear end of the cylinder 25 is a pair of fingers 26 which extend slidably through the grooves 12 in the insulating disc 6. The fingers 26 terminate in inturned rear end portions 27 which are engageable with the contact ring 14. Struck inwardly from the rear end portion of the cylinder 25 is a pair of lugs 28 which are engageable with the contact ring 13.

Threadedly mounted on the forward end portion of the cylinder 25 is a stationary inner shutter 29 having openings 30 therein. The stationary shutter 29 is further provided with circumferential grooves or recesses 31. A sleeve 32 is mounted for rotary adjustment on the shutter 29. Mounted in the forward end portion of the sleeve 32 is a jewel or lens 33. Also fixed in the forward portion of the sleeve 32, between the lens 33 and the stationary shutter 29, is a rotatably adjustable shutter 34 having openings 35 therein for communication with the openings 30. Lugs 36 on the shutter 34 are operable in the grooves or recesses 31 for limiting rotation of said shutter 34 in opposite directions. The end portions of the sleeve 32 are peened inwardly, as at 37, to secure this shutter assembly.

The slidable cylinder 25 is for the reception of an electric lamp 38. The lugs 28 constitute stops or abutments for a coil spring 39 which is engaged with the base 40 of the electric lamp 38 for positively connecting said lamp base 40 electrically to the slidable cylinder 25. The coil spring 23 is engaged with the center or base contact 41 of the electric lamp 38.

The assembly normally is in the position shown to advantage in Figure 4 of the drawings. In this position the elements 27 are engaged with the contact ring 14 and the elements 28 are disengaged from the ring 13. The conductor wires of the electric system are connected to the prongs 15, 16 and 20. In Figure 13 of the drawings, a remote automatic switch in the electric circuit is shown at 42. Reference character 43 designates a manually operable master switch. It will be assumed that the lamp 38 is supposed to light when the landing wheels of an airplane are in lowered position. When the landing wheels are thus lowered, the switch 42 is closed thereby for closing the circuit to the lamp 38 through the elements 20, 19, 22, 23, 41, 39, 27, 14, 16, et cetera. If the lamp 38 lights, the observer will know that the wheels are in lowered position. However, if the lamp 38 fails to light, the observer does not know whether the wheels are not, in fact, in lowered position, or whether said lamp is simply burned out. To test the lamp 38, the cylinder 25 is pushed rearwardly in the housing 1 for disengaging the elements 27 from the ring 14 and engaging the elements 28 with the ring 13. If the lamp 38 still fails to light, the observer will know that said lamp is burned out. If, however, when this test is made, the lamp 38 lights, the observer is warned that the switch 42 has not been closed by the lowering of the landing wheels. The volume of light from the lamp 38 may be controlled or regulated as desired by simply rotating the shutter 34 relative to the stationary shutter 29. Access may be readily had to the interior of the cylinder 25 for replacing the lamp 38, or for any other purpose, by unscrewing the shutter assembly from said cylinder.

It is believed that the many advantages of a signal light constructed in accordance with the present invention will be readily understood, and although a preferred embodiment of the device is an illustrated and described, it is to be understood that changes in the details of construction may be resorted to which will fall within the scope of the invention as claimed.

What is claimed is:

1. A signal light of the character described comprising a housing, a stationary disc of insulating material mounted in said housing, contact rings mounted on the opposite faces of the disc, a cylinder slidably mounted in the housing, an electric lamp mounted in said cylinder, means on the disc for electrically connecting the lamp to a source of current, and means on the cylinder for electrically connecting the lamp to one or the other of the rings upon movement of said cylinder in opposite directions in the housing.

2. A signal light of the character described comprising a tubular housing, a stationary disc of insulating material mounted in said housing, contact rings mounted on opposite faces of the disc, a cylinder slidably mounted in the housing, an electric lamp mounted in said cylinder, means on the disc for connecting the lamp to a source of current, means on the cylinder adapted to engage the rings for electrically connecting the lamp to one or the other of the rings upon movement of said cylinder in opposite directions in the housing, and resilient means for normally holding said cylinder and its connecting means in contact with one of said rings.

3. A signal light of the character described comprising a tubular housing, a stationary disc of insulating material fixed in one end of said housing, contact rings mounted on the opposite faces of the disc, means including a center contact for holding said rings in mounted position on the faces of the disc, a cylinder slidably mounted in the housing, an electric lamp mounted in said cylinder, resilient means associated with said center contact for electrically connecting the lamp to a source of current, and means on the cylinder for electrically connecting the lamp to one or the other of the rings upon movement of said cylinder in opposite directions in the housing.

4. A signal light comprising, in combination, a tubular housing, an insulator fixed in one end of the housing, a plurality of contacts and terminal connectors for said contacts mounted in fixed position and in spaced relationship on said insulator, an electric lamp having a pair of base mounted contacts, means for connecting one of the contacts on said insulator with one of the lamp contacts, a conducting lamp socket for selectively connecting the other of said lamp contacts with separate contacts on said insulator, said socket being slidably mounted in the housing and with respect to said insulator for movement between contact making positions, and a pair of electrical circuits having common connection with one of said insulator mounted contacts and individual connections with spaced contacts on said insulator which cooperate with said lamp socket, whereby said lamp may be selectively associated with either circuit by longitudinal movement of the lamp within the housing.

5. A signal light comprising, in combination, a tubular housing, an insulator fixed in one end of the housing, three contacts and terminal connectors for said contacts mounted in fixed position and in spaced relationship on said insulator, an electric lamp having a pair of base mounted connectors, means for electrically connecting one of said lamp connectors with one of the contacts on said insulator, a lamp socket slidably mounted in said housing forming an electrical connection with the other lamp base connector, contact means on said lamp socket for selective connection with one or the other of the other two contacts on said insulator on slidable movement of the socket in said housing, and resilient means for normally biasing said lamp socket contact means into contact with one of the insulator mounted contacts.

VINCENT ANTHONY MARCO.

REFERENCES CITED

The following references are of record in the file of this patent:

UNITED STATES PATENTS

| Number | Name | Date |
| --- | --- | --- |
| 1,194,386 | Horton | Aug. 15, 1916 |
| 1,349,651 | Bartlett | Aug. 17, 1920 |
| 1,798,049 | Urfer | Mar. 24, 1931 |
| 2,324,384 | Grimes | July 13, 1943 |
| 1,434,795 | Ryder | Nov. 7, 1922 |
| 2,234,954 | Bergman | Mar. 18, 1941 |
| 2,355,149 | De Giers | Aug. 8, 1944 |
| 1,998,072 | Blake | Apr. 16, 1935 |